Nov. 20, 1945.  C. J. GLASSER  2,389,428
COMBINED SPECTACLE AND TELESCOPE
Filed May 23, 1945

Inventor:
Charles J. Glasser.
By Thiess, Olson & Mecklenburger
Attys.

Patented Nov. 20, 1945

2,389,428

UNITED STATES PATENT OFFICE 2,389,428

COMBINED SPECTACLE AND TELESCOPE

Charles J. Glasser, Chicago, Ill.

Application May 23, 1945, Serial No. 595,421

5 Claims. (Cl. 88—41)

My invention relates to a combined spectacle and telescope apparatus.

One of the objects of my invention is to enable the wearer of the spectacles, if he sees an object anywhere in the vision field covered by the spectacles of which he would like to get a closer view, to turn his head until the object of which he wants a closer view is brought within the range of vision of the telescope construction mounted on the lens of the spectacles.

Such a construction might be useful in various situations, such as in watching a football or baseball game or a play, to enable the user to get a "close-up" of any particular player. It might also be useful in warfare—for example, the pilot of an airplane might see dimly some object in the distance, as to the nature of which he might be uncertain, in which case he would turn his head until the object was brought within the range of the telescope apparatus mounted on the lens. This would bring the object into closer range and enable its nature to be determined.

Further objects and advantages of the invention will be apparent from the description and claims.

In the drawing, in which my invention is illustrated,

Figure 1:
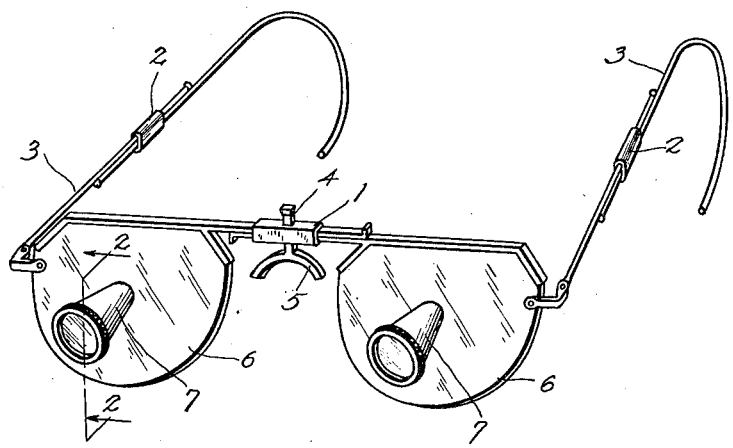
Figure 1 is a perspective view of a pair of spectacles having a pair of telescopes mounted on the lenses.
Figure 2:
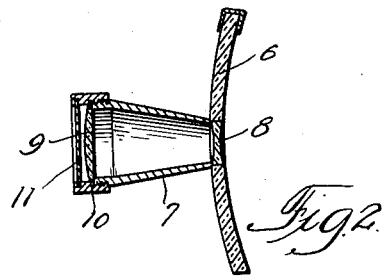
Fig. 2 is a vertical cross sectional view substantially on the line 2—2 of Fig. 1.

Referring to the drawing in detail, the construction shown comprises a pair of spectacles, in general of the usual type, but having provisions for making them universal by providing an adjustment at 1 for varying the interpupillary distance, adjustments at 2 to enable the length of the temples 3 to be varied, and an adjustment at 4 to enable the nose bridge 5 to be adjusted up and down.

Figure 3:
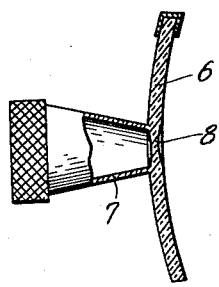
Fig. 3 is a vertical cross sectional view, similar to Fig. 2, showing a modified form.

Secured in the proper position on the spectacle lenses 6, respectively, are the telescopes, each comprising a barrel-like mounting 7, suitably secured to the lens, and a suitable set of telescope lenses 8 and 9, the eyepiece 8 being secured either to the barrel 7 or to the lens 6 and the objective 9 being adjustably mounted on the barrel 7 by means of a screw cap 10, or the like. It may be desirable to form the barrel 7, eyepiece 8 and the lens 6 as an integral transparent plastic, for example, Lucite (methyl methacrylate resin), as shown in Fig. 3. If desired, a suitable light filter 11 may be mounted in front of the objective 9.

Figure 4:
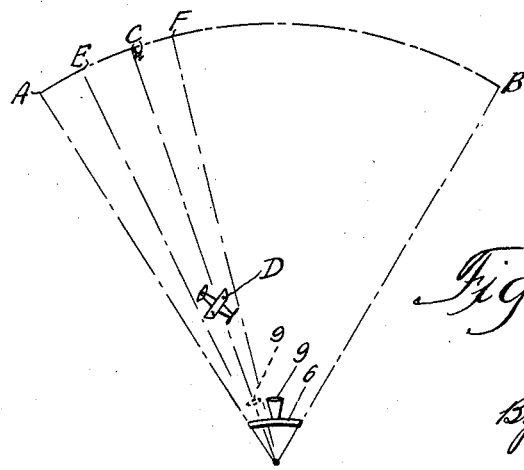
Fig. 4 is a schematic view showing the use of the telescope spectacles.

In Fig. 4, which illustrates a use of the binocular spectacles, the entire vision field covered by the lens 6 is indicated at A, B. At some point in this vision field, there may be a distant object, such as an airplane C which is vaguely visible through the ordinary lens 6 and which it may be desired to investigate further. The observer will turn his head to bring the objective 9 into line with the observed object C, whereupon this observed object will appear as though it were at point D, the remaining portion of the vision field from A to E and from F to B remaining unchanged.

I claim:

1. A spectacle telescope comprising a pair of lenses and a mounting therefor for securing them in position with respect to the eyes of the user, and a telescope mounted directly on and carried and supported solely by one of said lenses completely within and completely surrounded by the vision field of the lens on which it is mounted, said telescopic vision field being relatively small with respect to said lens vision field, said telescope comprising a supporting barrel extending forwardly from the lens, an objective lens piece mounted on the forward end of said barrel and an eyepiece mounted adjacent the rear end of the barrel, said barrel being frusto conical and tapering from front to rear, the distance between said eyepiece and objective being adjustable for focusing.

2. A spectacle telescope comprising a pair of lenses, a mounting therefor for securing them in position with respect to the eyes of the user, and a pair of telescopes mounted directly on and carried and supported solely by said lenses respectively, completely within and completely surrounded by the vision field of the lens on which it is mounted, said telescopic vision field being relatively small with respect to said lens vision field, said telescope comprising a supporting barrel extending forwardly from the lens, an objective lens piece mounted on the forward end of said barrel and an eyepiece mounted adjacent the rear end of the barrel, the distance between said eyepiece and objective being adjustable for focussing, said mounting comprising means for mounting said lenses carrying said telescopes for adjustment toward and from each other to vary the interpupillary distance.

3. A spectacle telescope comprising a pair of lenses and a mounting therefor for securing them in position with respect to the eyes of the user, and a telescope mounted directly on and carried and supported solely by one of said lenses completely within and completely surrounded by the vision field of the lens on which it is mounted, said telescopic vision field being relatively small with respect to said lens vision field, said telescope comprising an objective lens and an eyepiece mounted in the rear of said objective lens, the distance between said eyepiece and objective being adjustable for focusing 4. A spectacle telescope comprising a pair of lenses and a mounting therefor for securing them in position with respect to the eyes of the user, and a telescope mounted directly on and carried and supported solely by one of said lenses completely within and completely surrounded by the vision of the lens on which it is mounted, said telescopic vision field being relatively small with respect to said lens vision field, said telescope comprising an objective lens and an eyepiece mounted in the rear of said objective lens, the distance between said eyepiece and objective being adjustable for focusing, said eyepiece being substantially in the plane of its supporting lens.

5. A spectacle telescope comprising a pair of lenses and a mounting therefor for securing them in position with respect to the eyes of the user, and a telescope mounted directly on and carried and supported solely by one of said lenses completely within the vision field of the lens on which it is mounted, said telescopic vision field being relatively small with respect to said lens vision field, said telescope comprising a supporting barrel extending forwardly from the lens, an objective lens piece mounted on the forward end of said barrel and an eyepiece mounted adjacent the rear end of the barrel, the distance between said eyepiece and objective being adjustable for focusing.

CHARLES J. GLASSER.